Patented Nov. 28, 1950

2,532,047

UNITED STATES PATENT OFFICE 2,532,047

ALPHA-CYANO, ALPHA-ALKYL GLUTARALDEHYDIC ACIDS

Donald T. Warner and Owen A. Moe, Minneapolis, Minn., assignors to General Mills, Inc., a corporation of Delaware No Drawing. Application November 6, 1948, Serial No. 58,818

8 Claims. (Cl. 260—465.4)

The present invention relates to various intermediate aldehyde compounds which are particularly useful in various organic syntheses. The aldehydes contemplated by the present invention may be represented by the following structural formula

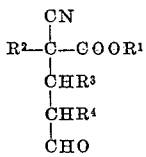

in which $R^1$ is the low alkyl group containing from one to four carbon atoms, $R^2$ is an aliphatic hydrocarbon group containing from one to twenty or more carbon atoms, and $R^3$ and $R^4$ may be hydrogen or methyl.

The aldehyde compounds of the present invention are useful in numerous ways. In view of the high functionality of the molecule it is possible for them to enter into many typical organic reactions and thus serve as useful intermediates in further organic syntheses.

It is, therefore, an object of the present invention to provide novel aldehyde compounds having the above formula.

It is a further object of the present invention to provide a novel process of producing such compounds.

These aldehydes may be prepared by the 1,4 addition of substituted cyanoacetic esters to alpha,beta-unsaturated aldehydes such as acrolein, methacrolein, and crotonaldehyde, which addition results in the direct production of the desired aldehyde. These reactions are carried out in the presence of an alkaline catalyst such as alkali metal alkoxide. The reaction conditions are subject to considerable variation depending upon the reactants and the amount and type of catalyst employed. In general, best yields of the aldehyde compounds are obtained when the amount of catalyst is held within the approximate range of 0.001 to 0.10 mole per mole of reagent used.

The temperature employed during the addition reaction is subject to change depending upon other conditions. Under some circumstances a temperature of 0–10° C. may be desirable. Under other circumstances, the reaction proceeds very smoothly and rapidly at temperatures up to 50° C. Since, however, temperatures above 50° C. may result in loss of reactants, it is preferred not to exceed this temperature, and in general, it is preferred to operate at temperatures within the range of 30–50° C.

The reaction is carried out in the presence of a suitable solvent diluent which does not enter into the reaction. Almost any solvent diluent which meets this test can be employed. Suitable solvents include alcohols such as ethanol, ethers such as diethyl ether, and hydrocarbon solvents such as benzene. The amount of solvent employed may be varied considerably. Usually it is desired to employ a quantity of solvent at least equal in volume to the cyanoacetic ester employed. More often the amount of solvent is several times the amount of the cyanoacetic ester.

In carrying out the reaction, it is preferred to prepare a solution of the cyanoacetic ester in the solvent and to add the catalyst to the solution. The resultant solution is then cooled to a suitable temperature depending upon the temperature at which it is desired to carry out the reaction. The unsaturated aldehyde is then added slowly to the solution over an extended period of time. In this way it is possible to control the temperature of the reaction mixture very readily to somewhere within the desired range and thus to control the reaction in the desired direction. After the reaction has been completed, the catalyst may be neutralized and the product worked up in a conventional manner.

The reaction is applicable to such alpha,beta-unsaturated aldehydes as acrolein, methacrolein, and crotonaldehyde. The alcoholic group of the cyanoacetic ester may be either methyl, ethyl, propyl, or butyl. However, inasmuch as cyanoacetic ester is conventionally available in the form of the ethyl ester, this form of compound is preferred. The aliphatic hydrocarbon substituent on the cyanoacetic ester methylene group may be varied from one to twenty or more carbon atoms. Many of these cyanoacetic ester compounds having aliphatic hydrocarbon substituents on the methylene carbon are known and reported in the literature. Any of them can be prepared by the condensation-reduction reaction of the aliphatic aldehyde with cyanoacetic ester under known conditions.

The following examples will serve to illustrate the invention.

*Example 1*

A solution of sodium ethoxide was prepared from 50 ml. absolute ethanol and 0.05 g. of sodium. To this solution, ethyl butylcyanoacetate (16.9 g.) was added and the mixture was cooled to +8° C. The cooled reaction medium was then treated with crotonaldehyde (7.05 g.) added dropwise. After a reaction time of one hour, the catalyst was neutralized with 0.5 ml. of glacial acetic acid, and the excess of solvent was removed in vacuo, leaving gamma-butyl-gamma-cyano-gamma-carbethoxy-beta-methyl-butyraldehyde as an oil.

The crude oil was dissolved in benzene, and the benzene solution was washed with water. The benzene was then removed in vacuo and gamma - butyl - gamma - cyano - gamma - carbethoxy-beta-methyl-butyraldehyde was distilled at 98–109° C./0.2 mm.

Calcd. for $C_{13}H_{21}O_3N$: N, 5.85. Found: N, 6.09.

The gamma - butyl - gamma - cyano - gamma-carbethoxy-beta-methyl-butyraldehyde was further characterized as the 2,4-dinitrophenylhydrazone melting at 173.8–174.5° C.

Calcd. for $C_{19}H_{25}O_6N_5$: C, 54.41; H, 6.01; N, 16.70. Found: C, 54.33; H, 6.10; N, 16.91.

*Example 2*

A solution of sodium ethoxide was prepared from 40 ml. of ethanol and 0.04 g. of sodium. This solution was mixed with ethyl butylcyanoacetate (16.9 g.) and cooled to +4° C. Acrolein (5.89 g.) was added dropwise, and the reaction was allowed to continue for an additional 35 minutes at +5° C. The catalyst was then neutralized with 0.6 g. of glacial acetic acid, and the reaction mixture was concentrated in vacuo to obtain gamma-butyl-gamma-cyano-gamma-carbethoxy-butyraldehyde as a thin syrup.

The crude aldehydo compound was dissolved in benzene and washed with water. The benzene layer was then concentrated in vacuo to remove benzene, and gamma - butyl - gamma - cyano-gamma-carbethoxybutyraldehyde was collected at 100–115° C./0.26–0.56 mm. This compound was further characterized as the 2,4-dinitrophenylhydrazone melting at 91–92° C. after crystallization from ethyl acetate and alcohol.

Calcd. for $C_{18}H_{23}O_6N_5$: C, 53.34; H, 5.72; N, 17.28. Found: C, 53.19; H, 5.71; N, 17.71.

*Example 3*

A solution of sodium ethoxide (from 50 ml. abs. EtOH and 0.05 g. of sodium) was mixed with ethyl butylcyanoacetate (16.9 g.) and the mixture was cooled to −1° C. Then alpha-methylacrolein (7.0 g.) was added dropwise over a 15-minute period. The reaction mixture was cooled for an additional period of approximately 16 hours. The catalyst was neutralized with glacial acetic acid (0.5 g.) and the excess ethanol was removed by distillation in vacuo. The residual viscous oil was dissolved in benzene (100 ml.), and the benzene solution was washed with four 50 ml. portions of water. The benzene solution was then dried over 20 g. of anhydrous $Na_2SO_4$, and the benzene was removed by distillation. The residual oil was distilled, and the aldehydo compound, gamma - butyl - gamma - cyano-gamma-carbethoxy - alpha - methyl - butyraldehyde, was collected at 90–100° C. (0.12–0.15 mm.) $n_D^{25}$ 1.4442. The gamma - butyl - gamma - cyano-gamma - carbethoxy - alpha - methylbutyraldehyde was further characterized as its 2,4-dinitrophenylhydrazone which melted at 141.5–142.5° C. after crystallization from an ethanol-ethylacetate solvent mixture.

As has been indicated previously, the various aldehyde compounds of the present invention are useful in further syntheses in view of the high functionality of the molecule. For example, they are useful in the synthesis of substituted biotins in accordance with the following generally indicated synthesis. The product of this reaction may be converted to substituted biotins in accordance with known reactions.

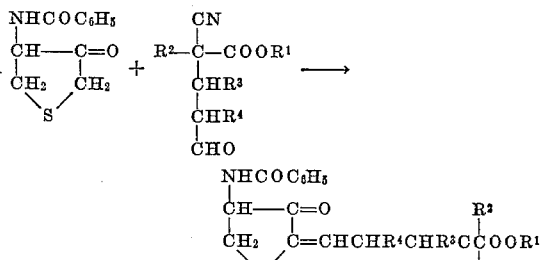

Aldehyde compounds of the present invention are also useful in the synthesis of substituted pimelic acids and also in the synthesis of hydantoins in accordance with the following series of reactions:

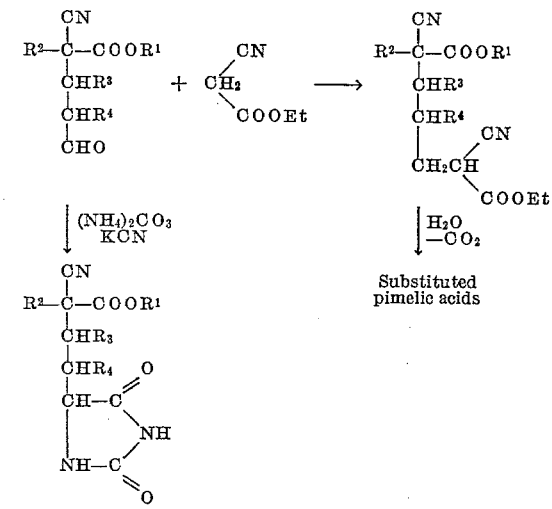

These compounds are also useful in the synthesis of beta-(3-indole)-propionic acids in accordance with the following reaction:

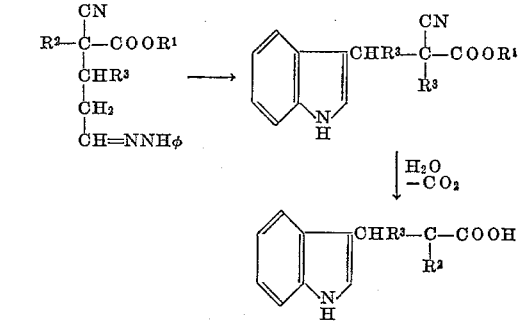

These aldehydes may also be used for the synthesis of amino acids by reacting them with HCN which reacts with the aldehyde group to form the cyanhydrin. This compound then may be reacted with ammonia to convert the hydroxyl group to an amino group, after which the resultant compound may be subjected to hydrolysis and decarboxylation to produce various amino acids.

The present invention is a continuation-in-part of our copending application, Serial No. 714,645, filed December 6, 1946, entitled Aldehydes, now abandoned.

While various modifications of the invention have been described, it is to be understood that other variations are possible without departing from the spirit thereof.

We claim as our invention:

1. Aldehyde compounds having the following formula

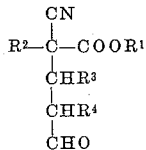

in which $R^1$ is an alkyl group containing from one to four carbon atoms, $R^2$ is an aliphatic hydrocarbon group, and $R^3$ and $R^4$ are selected from the group consisting of hydrogen and methyl.

2. Aldehyde compounds having the following formula

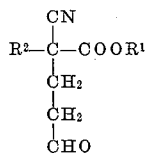

in which $R^1$ is an alkyl group containing from one to four carbon atoms, and $R^2$ is an aliphatic hydrocarbon group.

3. Aldehyde compounds having the following formula

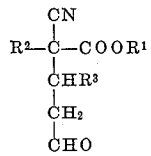

in which $R^1$ is an alkyl group containing from one to four carbon atoms, $R^2$ is an aliphatic hydrocarbon group, and $R^3$ is selected from the group consisting of hydrogen and methyl.

4. Aldehyde compounds having the following formula

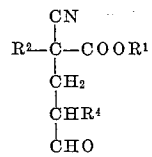

in which $R^1$ is an alkyl group containing from one to four carbon atoms, $R^2$ is an aliphatic hydrocarbon group, and $R^4$ is selected from the group consisting of hydrogen and methyl.

5. Aldehyde compounds having the following formula

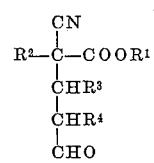

in which $R^1$ is an alkyl group containing from one to four carbon atoms, $R^2$ is a lower aliphatic hydrocarbon group, and $R^3$ and $R^4$ are selected from the group consisting of hydrogen and methyl.

6. Process of preparing aldehyde compounds having the following formula

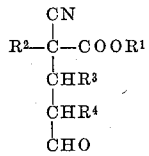

in which $R^1$ is an alkyl group containing from one to four carbon atoms, $R^2$ is an aliphatic hydrocarbon group, and $R^3$ and $R^4$ are selected from the group consisting of hydrogen and methyl, which comprises adding a cyanoacetic ester having an aliphatic hydrocarbon substituent to an alpha,beta-unsaturated aldehyde selected from the group consisting of acrolein, methacrolein, and crotonaldehyde, in the presence of an organic solvent diluent and in the presence of an alkaline condensation catalyst.

7. Process of preparing aldehyde compounds having the following formula

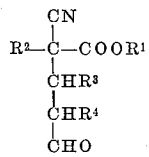

in which $R^1$ is an alkyl group containing from one to four carbon atoms, $R^2$ is an aliphatic hydrocarbon group, and $R^3$ and $R^4$ are selected from the group consisting of hydrogen and methyl, which comprises preparing a solution of a cyanoacetic ester having an aliphatic hydrocarbon substituent, in an organic solvent diluent containing an alkaline condensation catalyst, gradually adding thereto an alpha,beta-unsaturated aldehyde selected from the group consisting of acrolein, methacrolein, and crotonaldehyde, and maintaining the temperature of the reaction mixture not substantially in excess of 50° C.

8. Process of preparing aldehyde compounds having the following formula

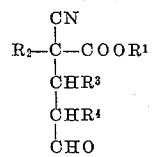

in which $R^1$ is an alkyl group containing from one to four carbon atoms, $R^2$ is an aliphatic hydrocarbon group, and $R^3$ and $R^4$ are selected from the group consisting of hydrogen and methyl, which comprises forming a solution of a cyanoacetic ester having an aliphatic hydrocarbon substituent, in an organic solvent diluent containing an alkali metal alkoxide in a molar ratio within the approximate range of 0.001 to 0.1 based on the cyanoacetic ester, gradually adding thereto an alpha,beta-unsaturated aldehyde selected from the group consisting of acrolein, methacrolein, and crotonaldehyde, and maintaining the temperature of the reaction mixture at not in excess of 50° C.

DONALD T. WARNER.
OWEN A. MOE.

REFERENCES CITED

The following references are of record in the file of this patent:

UNITED STATES PATENTS

| Number | Name | Date |
|---|---|---|
| 2,093,519 | Hamann | Sept. 21, 1937 |